United States Patent
Alvarez et al.

(10) Patent No.: US 6,169,155 B1
(45) Date of Patent: Jan. 2, 2001

(54) SILICONE GEL COMPOSITION AND SILICONE GEL PRODUCED THEREFROM

(75) Inventors: Khristopher Edward Alvarez, Midland; Paul Anthony Berry, Bay City; Michael Allen Stanga; Michael Raymond Strong, both of Midland, all of MI (US)

(73) Assignee: Dow Corning Corporation, Midland, MI (US)

( * ) Notice: Under 35 U.S.C. 154(b), the term of this patent shall be extended for 0 days.

(21) Appl. No.: 09/231,447

(22) Filed: Jan. 14, 1999

(51) Int. Cl.[7] .............................. C08G 77/20; C08G 77/12
(52) U.S. Cl. ................................. 528/15; 528/31; 528/32; 525/478; 524/268; 524/731
(58) Field of Search ................................. 528/15, 31, 32; 525/478

(56) References Cited

U.S. PATENT DOCUMENTS

| | | | |
|---|---|---|---|
| 2,877,255 | 3/1959 | Clark | 260/448.2 |
| 3,419,593 | 12/1968 | Willing | 260/448.2 |
| 3,884,866 | * 5/1975 | Jeram et al. | 523/203 |
| 4,162,243 | * 7/1979 | Lee et al. | 260/37 SB |
| 4,374,967 | 2/1983 | Brown et al. | 528/15 |
| 4,529,789 | 7/1985 | Kroupa | 528/15 |
| 4,766,176 | 8/1988 | Lee et al. | 525/100 |
| 5,017,654 | 5/1991 | Togashi et al. | 525/100 |
| 5,314,979 | * 5/1994 | Okinoshima et al. | 528/15 |
| 5,332,795 | * 7/1994 | Fujiki et al. | 528/15 |
| 5,371,163 | 12/1994 | Wilson | 528/15 |
| 5,446,185 | 8/1995 | Cobb et al. | 556/451 |
| 5,493,040 | 2/1996 | Cobb et al. | 556/451 |
| 5,571,853 | 11/1996 | Ikeno et al. | 524/268 |
| 5,985,462 | * 11/1999 | Herzig et al. | 428/447 |

FOREIGN PATENT DOCUMENTS

| | | | |
|---|---|---|---|
| 0 509 515 A1 | 4/1992 | (EP) | C08L/83/04 |
| 0 727 462 A2 | 8/1996 | (EP) | C08L/83/04 |
| 62-39660 | * 2/1987 | (JP) . | |
| 62-039660 | 2/1987 | (JP) | C08L/83/07 |

* cited by examiner

*Primary Examiner*—Margaret G. Moore
(74) *Attorney, Agent, or Firm*—Larry A. Milco

(57) ABSTRACT

A silicone gel composition, (A) 100 parts by weight of a first polydiorganosiloxane containing an average of at least two silicon-bonded alkenyl groups per molecule and having a viscosity of from 0.2 to 10 Pa·s at 25° C.; (B) at least about 0.5 part by weight of a second polydiorganosiloxane containing an average of at least two silicon-bonded alkenyl groups per molecule, wherein the second polydiorganosiloxane has a viscosity at 25° C. of at least four times the viscosity of the first polydiorganosiloxane at 25° C.; (C) an organohydrogensiloxane having the average formula $R^7Si(SiOR^8_2H)_3$ wherein $R^7$ is an alkyl group having 1 to 18 carbon atoms or aryl, $R^8$ is an alkyl group having 1 to 4 carbon atoms, in an amount sufficient to provide from 0.1 to 1.5 silicon-bonded hydrogen atoms per alkenyl group in components (A) and (B) combined; and (D) a hydrosilylation catalyst in an amount sufficient to cure the composition. A silicone gel comprising a reaction product of the silicone gel composition. A kit for preparing a silicone gel composition.

25 Claims, No Drawings

SILICONE GEL COMPOSITION AND SILICONE GEL PRODUCED THEREFROM

FIELD OF THE INVENTION

The present invention relates to a silicone gel composition and more particularly to an addition-curable silicone gel composition including a specific combination of alkenyl-containing polydiorganosiloxanes. This invention also relates to a silicone gel produced from such composition.

BACKGROUND OF THE INVENTION

Silicone gels have numerous commercial applications due to their unique properties, which include excellent dielectric properties, moisture resistance, thermal stability, vibration dampening properties, and optical transparency. For example, silicone gels are widely used as pottants and encapsulants for preserving and protecting delicate electronic devices in severe environments. Additional applications of silicone gels include optical joint sealants, optical waveguides, keyboard handrests, and clean room HEPA filter sealants. Addition-curable silicone gel compositions comprising an alkenyl-containing polydiorganosiloxane polymer, an organohydrogenpolysiloxane, and a hydrosilylation catalyst are known in the art. Illustrative of such compositions are U.S. Pat. No. 4,374,967 to Brown et al.; U.S. Pat. No. 4,529,789 to Kroupa; U.S. Pat. No. 5,332,795 to Fujiki et al.; U.S. Pat. No. 5,571,853 to Ikeno et al.; U.S. Pat. No. 5,371,163 to Wilson; European Patent Application No. 727462 to Hamada et al.; and European Patent Application No. 509515 to Enami et al. However, the preceding references do not teach the specific combination of polydiorganosiloxanes or the particular organohydrogensiloxane of the present invention.

Furthermore, Japanese Laid Open Patent Publication (KOKAI) SHO 62(1987)-39660 to Mogi et al. discloses a gel composition for optical joints comprising (A) a polyorganosiloxane containing an average of 0.1–2.0 vinyl groups per molecule and having a viscosity of 50–100,000 cP at 25° C.; (B) a siloxane expressed by the general formula $R^1Si(OSiR^2_2H)_3$ where $R^1$ is an alkyl group having 1 to 4 carbon atoms or a phenyl group, and $R^2$ is an alkyl group having 1 to 4 carbon atoms, in an amount such that the number of silicon-bonded hydrogen atoms in component (B) per vinyl group in component (A) is 0.1 to 0.8 or 1.5 to 3.0; and (C) a catalyst selected from the group consisting of platinum, palladium, and rhodium catalysts. According to Mogi et al., the composition forms a gel that has excellent adhesion with respect to base materials at ambient temperatures or moderately hot temperatures, does not peel from the base material or undergo cracking due to thermal shock, and undergoes only slight modifications in physical properties and color at high temperatures. However, Mogi et al. neither teach nor suggest the specific combination of polydiorganosiloxanes of the present invention.

Although silicone gels produced from the aforementioned compositions exhibit a wide range of adhesive properties, there is a continued need for silicone gels having improved tack. Importantly, the present inventors have discovered that a silicone gel composition containing a specific combination of alkenyl-containing polydiorganosiloxanes cures to form a gel having unexpectedly superior tack.

SUMMARY OF THE INVENTION

The present invention is directed to a silicone gel composition comprising:

(A) 100 parts by weight of a first polydiorganosiloxane containing an average of at least two silicon-bonded alkenyl groups per molecule and having a viscosity of from 0.2 to 10 Pa·s at 25° C.;

(B) at least about 0.5 part by weight of a second polydiorganosiloxane containing an average of at least two silicon-bonded alkenyl groups per molecule, wherein the second polydiorganosiloxane has a viscosity at 25° C. of at least four times the viscosity of the first polydiorganosiloxane at 25° C.;

(C) an organohydrogensiloxane having the average formula $R^7Si(SiOR^8_2H)_3$ wherein $R^7$ is an alkyl group having 1 to 18 carbon atoms or aryl, $R^8$ is an alkyl group having 1 to 4 carbon atoms, in an amount sufficient to provide from 0.1 to 1.5 silicon-bonded hydrogen atoms per alkenyl group in components (A) and (B) combined; and (D) a hydrosilylation catalyst in an amount sufficient to cure the composition.

The present invention is also directed to a silicone gel comprising a reaction product of the silicone gel composition described above.

The present invention is further directed to a multi-part silicone gel composition comprising components (A) through (D) in two or more parts, provided neither component (A) nor component (B) are present with components (C) and (D) in the same part.

The present invention is still further directed to a kit for preparing a silicone gel composition, comprising a first package containing a portion of component (A), all or a portion of component (B), and all of component (D), and a second package containing the remainder of components (A) and (B), and all of component (C).

The silicone gel composition of the present invention has numerous advantages, including excellent flow, low VOC (volatile organic compound) content, and rapid low temperature cure. Moreover, the present silicone gel composition cures to form a silicone gel having unexpectedly superior tack, excellent thermal stability, and good dielectric properties.

With regard to flow, the present composition possesses the rheological properties required for a number of applications. For example the composition of the instant invention is easily dispensed using standard equipment and exhibits rapid flow around and/or under electronic components.

Further, the composition of the present invention, which does not require an organic solvent to achieve a workable viscosity, has a very low VOC content. Consequently, the present silicone gel composition avoids the health, safety, and environmental hazards associated with solvent-borne silicone compositions. In addition, the solventless composition of the present invention typically undergoes less shrinkage during curing than solvent-borne silicone compositions.

The silicone gel composition of the present invention also cures rapidly at room temperature or moderately elevated temperatures without either an exotherm or the formation of byproducts. In fact, the cure rate of the silicone gel can be conveniently adjusted by controlling the concentration of catalyst and/or optional inhibitor.

Importantly, the silicone gel composition of the present invention cures to form a silicone gel having unexpectedly improved tack relative to gels produced from similar compositions lacking the second alkenyl-containing polydiorganosiloxane, component (B), and/or containing a linear organohydrogensiloxane in place of component (C). Also, only a small amount of the higher viscosity, second alkenyl-containing polydiorganosiloxane is required to produce a significant improvement in tack. Consequently, the second alkenyl-containing polydiorganosiloxane has a minimal effect on the viscosity of the present silicone gel composition.

The excellent self-adhesive properties of the present silicone gel can facilitate repairs, particularly in electronic applications. For example, a section of a silicone gel pottant or encapsulant can be removed to permit repair of an underlying component. Subsequently, the silicone gel composition of the instant invention can be dispensed into the repaired area and cured in place. The repaired region will become an integral part of the original material. Also, in the absence of an optional filler, the silicone gel is transparent, allowing facile visual inspection of protected components and leads.

Furthermore, the silicone gel composition of the present invention cures to form a resilient gel having excellent thermal stability and flexibility in the temperature range from −50 to 150° C. The cured silicone gel retains much of the stress relief and self-healing healing qualities of a liquid, while developing much of the dimensional stability and non-flow characteristics of a solid elastomer. The silicone gel thus provides effective protection from stress and strain caused by thermomechanical shock and vibration.

Additionally, the silicone gel of the present invention exhibits good dielectric properties, even at high frequencies. Moreover, these properties are maintained at both low and high temperature extremes.

The silicone gel composition of the present invention is particularly useful for potting or encapsulating electronic circuits and devices. For example, the present composition can be used to pot or encapsulate automotive electronic control modules, such as ignition and transmission control modules.

These and other features, aspects, and advantages of the present invention will become better understood with reference to the following description and appended claims.

DETAILED DESCRIPTION OF THE INVENTION

Component (A) of the present invention is a first polydiorganosiloxane containing an average of at least two silicon-bonded alkenyl groups per molecule. Suitable alkenyl groups contain from 2 to about 6 carbon atoms and are exemplified by, but not limited to vinyl, allyl, and hexenyl. The alkenyl groups in component (A) may be located at terminal, pendant (non-terminal), or both terminal and pendant positions. The remaining silicon-bonded organic groups in component (A) are independently selected from the group consisting of monovalent hydrocarbon and monovalent halogenated hydrocarbon groups free of aliphatic unsaturation. These groups typically contain from 1 to about 8 carbon atoms, preferably from 1 to 4 carbon atoms, and are exemplified by, but not limited to alkyl such as methyl, ethyl, propyl, and butyl; aryl such as phenyl; and halogenated alkyl such as 3,3,3-trifluoropropyl. Typically, at least 50 percent of the organic groups in component (A) are methyl.

The structure of component (A) is typically linear, however it may contain some branching due to the presence of trifunctional siloxane units. The viscosity of component (A) at 25° C., which varies with molecular weight and structure, is typically from 0.2 to 10 Pa·s, preferably from 0.2 to 5 Pa·s, and more preferably from 0.2 to 3 Pa·s. When the viscosity of component (A) exceeds 10 Pa·s, the silicone gel composition does not flow at a rate useful for many commercial processes, including potting and encapsulating. Preferably, component (A) is a polydiorganosiloxane having the general formula $R_4R^3_2SiO(R^3_2SiO)_nSiR^3_2R^4$ wherein each $R^3$ is independently selected from the group consisting of monovalent hydrocarbon and monovalent halogenated hydrocarbon groups free of aliphatic unsaturation, as defined above; $R^4$ is alkenyl, as defined above; and n has a value such that the viscosity of component (A) is from 0.2 to 10 Pa·s at 25° C. Typically n is from about 200 to about 600. Preferably, $R^3$ is methyl and $R^4$ is vinyl.

Specific examples of polydiorganosiloxanes useful in the present invention include, but are not limited to the following: $ViMe_2SiO(Me_2SiO)_nSiMe_2Vi$, $ViMe_2SiO(Me_2SiO)_{0.92}(MePhSiO)_{0.08n}SiMe_2Vi$  $ViMe_2SiO(Me_2SiO)_{0.98n}$, $(MeViSiO)_{0.02n}SiMe_2Vi$, $ViMePhSiO(Me_2SiO)_{0.92n}$, $(MePhSiO)_{0.08n}SiMePhVi$, $Me_3SiO(Me_2SiO)_{0.95n}(MeViSiO)_{0.05n}SiMe_3$, $PhMeViSiO(Me_2SiO)_nSiPhMeVi$, and others, where Me, Vi, and Ph denote methyl, vinyl, and phenyl respectively and n is as defined above. Preferred polydiorganosiloxanes are dimethylvinylsiloxy-terminated polydimethylsiloxanes. A particularly preferred polydiorganosiloxane is a dimethylvinylsiloxy-terminated polydimethylsiloxane having a viscosity of from 0.3 to 0.6 Pa·s at 25° C.

Methods for preparing component (A) of the present composition, such as condensation of the corresponding halosilanes or equilibration of cyclic polydiorganosiloxanes, are well known in the art.

Component (B) of the present invention is a second polydiorganosiloxane containing an average of at least two silicon-bonded alkenyl groups per molecule. Component (B) is identical in all respects to component (A) described above except for viscosity. The viscosity of component (B) relative to the viscosity of component (A), each measured at 25° C., is critical with respect to achieving the superior adhesive properties of the present invention. In particular, the viscosity of component (B) is at least four times the viscosity of component (A). When the viscosity of component (B) is less than 4 times the viscosity of component (A), the tack of the cured silicone gel is not appreciably enhanced relative to the gel produced from the same composition absent component (B).

Preferably, component (B) is a polydiorganosiloxane having the general formula $R^6R^5_2SiO(R^5_2SiO)_nSiR^5_2R^6$ wherein each $R^5$ is independently selected from the group consisting of monovalent hydrocarbon and monovalent halogenated hydrocarbon groups free of aliphatic unsaturation, as defined above; $R^6$ is alkenyl, as defined above; and n has a value such that the viscosity of component (B) at 25° C. is at least four times the viscosity of component (A) at 25° C. Preferably, $R^5$ is methyl and $R^6$ is vinyl.

Component (B) can comprise a single polydiorganosiloxane or a mixture of two or more different polydiorganosiloxanes, each having a viscosity at least four times the viscosity of component (A).

Specific examples of polydiorganosiloxanes suitable for use as component (B) are identical to those recited above for component (A), except the value of n is such that the viscosity of component (B) at 25° C. is at least four times the viscosity of component (A) at 25° C. Preferred polydiorganosiloxanes are dimethylvinylsiloxy-terminated polydimethylsiloxanes. In a preferred embodiment of the present invention, component (A) is a dimethylvinylsiloxy-terminated polydimethylsiloxane having a viscosity of from 0.3 to 0.6 Pa·s at 25° C. and component (B) is a dimethylvinylsiloxy-terminated polydimethylsiloxane having a viscosity of from 45 to 65 Pa·s at 25° C.

The concentration of component (B) in the composition of the present invention is at least about 0.5 part by weight, typically from about 0.5 part to about 10 parts by weight, and preferably from about 1 part to about 5 parts by weight, per 100 parts by weight of component (A). When the concentration of component (B) is less than about 0.5 part by weight, the tack of the cured silicone gel is not markedly improved relative to the tack of the gel obtained from the same composition absent component (B). When the concentration of component (B) exceeds about 10 parts by weight, no further improvement in the tack of the cured silicone gel typically occurs. However, as the concentration of component (B) increases above about 10 parts by weight, the viscosity of the resultant silicone gel composition also increases.

Component (C) of the present invention is an organohydrogensiloxane having the formula $R^7Si(OSiR^8{}_2H)_3$ wherein $R^7$ is an alkyl group having 1 to 18 carbon atoms or aryl, and $R^8$ is an alkyl group having 1 to 4 carbon atoms. The alkyl groups represented by $R^7$ and $R^8$ can be branched or unbranched chains. Examples of suitable $R^7$ groups include, but are not limited to methyl, ethyl, n-propyl, iso-propyl, butyl, 2-methylpropyl, pentyl, 2-methylbutyl, 2,2-dimethylpropyl, hexyl, 2-methylpentyl, 3-methylpentyl, 2,2-dimethybutyl, 2,3-dimethylbutyl, heptyl, 2-methyhexyl, 3-methylhexyl, 2,2-dimethylpentyl, 2,3-dimethylpentyl, 2,4-dimethylpentyl, 3,3-dimethylpentyl, 3-ethylpentyl, 2,2,3-trimethylbutyl, octyl, nonyl, decyl, undecyl, dodecyl, tridecyl, tetradecyl, pentadecyl, hexadecyl, heptadecyl, and octadecyl, phenyl, tolyl, and benzyl. Preferably $R^7$ is n-propyl. Examples of suitable $R^8$ groups include methyl, ethyl, propyl, n-butyl, and 2-methylpropyl. Preferably $R^8$ is methyl, based on ease of synthesis and cost and availability of the corresponding starting material.

Component (C) can be a single organohydrogensiloxane or a mixture of two or more different organohydrogensiloxanes, each having the above formula. Additionally, component (C) can contain minor amounts of other organohydrogensiloxanes normally produced as by-products during the preparation of this component.

Specific examples of organohydrogensiloxanes useful in the present invention include, but are not limited to the following: $CH_3Si(OSiMe_2H)_3$, $CH_3CH_2Si(OSiMe_2H)_3$, $CH_3CH_2CH_2CH_2Si(OSiMe_2H)_3$, $CH_3CH_2CH_2SiCOSiMe_2H)_3$, where Me denotes a methyl group. A preferred organohydrogensiloxane according to the present invention is 1,1,5,5-tetramethyl-3-(n-propyl)-3-(dimethylsilyloxy)trisiloxane, $CH_3CH_2CH_2Si(OSiMe_2H)_3$.

The concentration of component (C) in the composition of the present invention is sufficient to provide from 0.1 to 1.5 silicon-bonded hydrogen atoms and preferably from 0.3 to 1.1 silicon-bonded hydrogen atoms, per alkenyl group in components (A) and (B) combined.

Methods of preparing the organohydrogensiloxanes of the present invention by co-hydrolysis of the appropriate chlorosilanes are known in the art. U.S. Pat. No. 2,877,255 to Clark; Japanese Laid Open Patent Application (KOKAI) SHO 62(1987)-39660 to Mogi et al.; and U.S. Pat. No. 5,446,185 and U.S. Pat. No. 5,493,040 to Cobb et al. are hereby incorporated by reference to teach how to make organohydrogensiloxanes suitable for use in the composition of the present invention.

Component (D) of the present invention is a hydrosilylation catalyst that promotes the addition reaction of components (A) and (B) with component (C). The hydrosilylation catalyst can be any of the well known hydrosilylation catalysts comprising a platinum group metal, a compound containing a platinum group metal, or a microencapsulated platinum group metal or compound containing same. These metals include platinum, rhodium, ruthenium, palladium, osmium and iridium. Platinum and platinum compounds are preferred catalysts based on their high activity level in hydrosilylation reactions. Examples of the resins employed in microencapsulated catalysts include, but are not limited to organosilicon resins and organic resins derived from ethylenically unsaturated hydrocarbons and/or esters of ethylenically unsaturated carboxylic acids, such as acrylic and methacrylic acids. Microencapsulated hydrosilylation catalysts are described in U.S. Pat. No. 4,766,176 and U.S. Pat. No. 5,017,654, which are hereby incorporated by reference. A preferred class of platinum catalysts are the complexes of chloroplatinic acid with certain vinyl-containing organosiloxane compounds disclosed by Willig in U.S. Pat. No. 3,419,593, which is hereby incorporated by reference. A particularly preferred catalyst of this type is the reaction product of chloroplatinic acid and 1,3-diethenyl-1,1,3,3-tetramethyldisiloxane.

The hydrosilylation catalyst is present in an amount sufficient to cure the composition of the present invention. Typically, the concentration of component (D) is sufficient to provide from 0.1 to 100 ppm (part per million), preferably from 1 to 500 ppm, and more preferably from 1 to 50 parts per million of a platinum group metal, based on the combined weight of components (A), (B), and (C). The rate of cure is very slow below 0.1 ppm of platinum group metal. The use of more than 1000 ppm of platinum group metal results in no appreciable increase in cure rate, and is therefore uneconomical. The concentration of the hydrosilylation catalyst required to achieve a desired rate of cure can be readily determined by routine experimentation.

Mixtures of the aforementioned components (A), (B), (C), and (D) may begin to cure immediately on mixing at ambient temperature. To obtain a longer working time or "pot life", the activity of the catalyst under ambient conditions can be retarded or suppressed by the addition of a suitable inhibitor to the composition of the present invention. A catalyst inhibitor retards curing of the present composition at ambient temperature, but does not prevent the composition from curing at elevated temperatures. In order to be effective in this invention, the platinum catalyst inhibitor must be soluble in the composition. Suitable platinum catalyst inhibitors include various "ene-yne" systems such as 3-methyl-3-penten-1-yne and 3,5-dimethyl-3-hexen-1-yne; acetylenic alcohols such as 3,5-dimethyl-1-hexyn-3-ol, 1-ethynyl-1-cyclohexanol, and 2-Phenyl-3-butyn-2-ol; maleates and fumarates, such as the well known dialkyl, dialkenyl, and dialkoxyalkyl fumarates and maleates; cyclovinylsiloxanes; and benzyl alcohol. Acetylenic alcohols constitute a preferred class of inhibitors due to their high activity in hydrosilylation reactions.

The concentration of platinum catalyst inhibitor in the present composition is sufficient to retard curing of the composition at ambient temperature without preventing or excessively prolonging cure at elevated temperatures. This concentration will vary widely depending on the particular inhibitor used, the nature and concentration of the hydrosilylation catalyst, and the nature of the organohydrogenpolysiloxane.

Inhibitor concentrations as low as one mole of inhibitor per mole of platinum group metal will in some instances yield a satisfactory storage stability and cure rate. In other instances, inhibitor concentrations of up to 500 or more moles of inhibitor per mole of platinum group metal may be required. Generally, the inhibitor is present in an amount from 1 to 100 moles per mole of platinum group metal. The optimum concentration for a particular inhibitor in a given composition can be readily determined by routine experimentation.

The composition of the present invention can further comprise a non-functional silicone fluid. As used herein, the term "non-functional" means that the silicone fluid is free of functional groups that react with components (A), (B), or (C) under normal cure conditions. Such a silicone fluid can be used to alter the viscosity of the present silicone gel composition, depending on the requirements for a particular application. What's more, the silicone fluid reduces the cost of the silicone gel composition. Importantly, the silicone fluid does not "bleed" or migrate from the cured silicone gel of the instant invention. By comparison, oily materials "bleed" out of some conventional silicone gels, causing deformation of the gel and contamination of surrounding areas.

Silicone fluids suitable for use in the composition of the present invention have a viscosity at 25° C. of from about 0.001 to about 50 Pa·s, preferably from about 0.02 to about 10 Pa·s, and more preferably from about 0.05 to about 5 Pa·s. Preferably, the silicone fluid has a general formula selected from the group consisting of $[(R^9)_2SiO]_n$ and $(R^9)_3SiO—[(R^9)_2SiO]_q—Si(R^9)_3$, wherein each $R^9$ is independently selected from the group consisting of alkyl, aryl, and $—[(R^{10})_2SiO]_p—Si(R^{10})_3$ wherein $R^{10}$ is alkyl or aryl, n is from about 2 to about 10, p is 0 or greater, and q is 0 or greater. Preferably q is from about 0 to about 1000. Also, preferably $R^9$ and $R^{10}$ are each independently selected from the group consisting of unbranched alkyl groups having from 1 to about 10 carbon atoms, branched alkyl groups having from 1 to about 10 carbon atoms, substituted aromatic hydrocarbon groups containing from 1 to about 10 carbon atoms in one or more side chains, and cycloalkyl groups having from about 3 to about 6 carbon atoms. More preferably, $R^9$ and $R^{10}$ are each independently unbranched alkyl groups having from 1 to about 10 carbon atoms, such as methyl, ethyl, n-propyl, and isopropyl, and octyl. The silicone fluid of the present invention can be linear, branched, cyclic, or a mixture thereof. Mixtures of the aforementioned fluids are also useful herein. Many of the linear, branched, and cyclic silicone fluids have melting points below about 250 C. Such materials are also commonly referred to as silicone liquids, silicone fluids, or silicone oils. A detailed description of silicone fluids can be found in many references, including "Chemistry and Technology of Silicones" by W. Knoll, Academic Press, 1968.

Specific examples of linear non-functional silicone fluids suitable for use in the composition of the present invention include, but are not limited to the trimethylsiloxy-terminated dimethylsiloxane fluids sold by Dow Corning Corporation under the trade name "Dow Corning® 200 Fluids". These silicone fluids are manufactured to yield essentially linear oligomers and/or polymers typically having a viscosity of from 0.001 to about 50 Pa·s at 25° C. Such fluids are primarily linear but can include cyclic and/or branched structures. A preferred silicone fluid is a trimethylsiloxy-terminated polydimethylsiloxane having a viscosity of about 0.1 Pa·s at 25° C.

Specific examples of cyclic non-functional silicone fluids useful in the present composition include, but are not limited to, the cyclic polydimethylsiloxanes sold by Dow Corning Corporation under the trade names "Dow Corning® 244, 245, 344, and 345 Fluids", depending on the relative proportions of octamethylcyclotetrasiloxane and decamethylcyclopentasiloxane. Mixtures of the straight-chain and cyclic dimethyl siloxanes are also useful in the composition of the present invention.

Specific examples of branched non-functional silicone fluids include, but are not limited to $Me_3SiO[(OSiMe_3)_2SiO]SiMe_3$ and $Me_3SiO[(OSiMe_3)MeSiO]SiMe_3$.

The concentration of the non-functional silicone fluid in the composition of the present invention is typically less than about 300 parts by weight, preferably from about 30 to about 150 parts by weight, per 100 parts by weight of component (A). As the concentration of the non-functional silicone fluid increases, the tack of the cured silicone gel decreases. The optimum concentration of the non-functional silicone fluid for a particular application can be readily determined by routine experimentation.

In general, the composition of the present invention can further comprise additives typically used in the formulation of silicone compositions, such as surfactants, chain extenders, antioxidants, pigments, fire retardants, thermal and UV stabilizers, and fillers, provided the ingredient does not adversely affect the physical properties of the cured product, particularly the tack. Examples of suitable fillers include, but are not limited to, silica, fused silica, alumina, boron nitride, and aluminum nitride. Fused silica is a particularly preferred filler in compositions used to encapsulate random access memory (RAM) devices, which are very sensitive to alpha particle emissions.

The composition of the present invention can be a one-part composition comprising components (A) through (D) in a single part or, alternatively, a multi-part composition comprising components (A) through (D) in two or more parts, provided neither component (A) nor component (B) are present with components (C) and (D) in the same part. For example, a multi-part composition can comprise a first part containing a portion of component (A), a portion of component (B), and all of component (D) and a second part containing the remaining portions of components (A) and (B), and all of component (C).

The composition of the instant invention is typically prepared by combining components (A) through (D) and any optional ingredients in the stated proportions at ambient temperature. Also, the multi-part composition of the present invention can be prepared by combining two or more parts, wherein each part is as defined above. Although the order of addition of the various components is not critical if the composition is to be used immediately, the hydrosilylation catalyst is preferably added last at a temperature below about 30° C. to prevent premature curing of the composition. Mixing can be accomplished by any of the techniques known in the art such as milling, blending, and stirring, either in a batch or continuous process. The particular device is determined by the viscosity of the components and the final composition.

The silicone gel composition of the present invention can be stored in various ways. For example, the present composition can be stored as a one-part composition comprising components (A) through (D) in the above-stated proportions in a single part. Because the components of the present composition may be begin to react immediately upon admixture, even in the presence of an inhibitor, the one-part composition is preferably stored at a temperature below 0° C., more preferably from −30 to −20° C. Alternatively, the composition of the present invention can be stored in a kit comprising a first package and a second package.

According to the present invention, a kit for preparing a silicone gel composition comprises a first package containing a homogeneous mixture of (A) 5 to 95 parts by weight of a first polydiorganosiloxane containing an average of at least two silicon-bonded alkenyl groups per molecule and having a viscosity of from 0.2 to 10 Pa·s at 25° C.; (B) 0 to 10 parts by weight of a second polydiorganosiloxane containing an average of at least two silicon-bonded alkenyl groups per molecule, wherein the second polydiorganosiloxane has a viscosity at 25° C. of at least four times the viscosity of the first polydiorganosiloxane at 25° C.; and (D) a hydrosilylation catalyst; and a second package containing (A) 95 to 5 parts by weight of a first polydiorganosiloxane containing an average of at least two silicon-bonded alkenyl groups per molecule and having a viscosity of from 0.2 to 10 Pa·s at 25° C.; (B) 0 to 10 parts by weight of a second polydiorganosiloxane containing an average of at least two silicon-bonded alkenyl groups per molecule, wherein the second polydiorganosiloxane has a viscosity at 25° C. of at least four times the viscosity of the first polydiorganosiloxane at 25° C.; and (C) an organohydrogensiloxane having the average formula $R^7Si(OSiR^8_2H)_3$ wherein $R^7$ is an alkyl group having 1 to 18 carbon atoms or aryl, $R^8$ is an alkyl group having 1 to 4 carbon atoms, and wherein the amount of component (A) in the first package and the second package combined is 100 parts by weight, the amount of component (B) in the first package and the second package combined is at least about 0.5 part by weight, component (C) is present in an amount sufficient to provide from 0.1 to 1.5 silicon-bonded hydrogen atoms per alkenyl group in components (A) and (B) in the first package and the second package combined; and component (D) is present in an amount sufficient to cure the composition formed by combining the first package and the second package.

Preferably, components (A) through (D) in the kit of the present invention are apportioned in such a manner that equal weight amounts of the contents of each package can be mixed to produce the silicone gel composition. Individual sealed packages of such a kit can generally be stored for at least six months at ambient temperature without any deterioration in the performance of the composition produced upon their admixture.

The silicone gel composition of this invention can be cured at ambient temperature or at a moderately elevated temperature, for example, 40 to 70° C. For example, the present silicone gel composition typically cures in about 20 to 30 minutes at room temperature and in less than about 10 minutes at 50° C.

The silicone gel composition of the present invention is particularly useful for potting or encapsulating electronic circuits and microelectronic devices. Specific devices include the various automotive electronic control modules, such as ignition and transmission control modules.

These and other features, aspects, and advantages of the present invention will become better understood with reference to the following description and appended claims.

EXAMPLES

The following examples are presented to further illustrate the composition of this invention, but are not to be considered as limiting the invention, which is delineated in the appended claims. All parts and percentages reported in the examples are by weight. The following methods and materials were employed in the examples:

Tack was measured using a Texture Technologies TA.XT2 Texture Analyzer at 23±2° C. The flat end of a cylindrical acrylic probe having a diameter of 12.7 mm was inserted into a silicone gel surface to a depth of 10 mm. The probe was then withdrawn at a rate of 1.0 mm/s and the maximum force required to separate the probe from the gel was determined. The results, expressed in units of gram-force, represent the average of five measurements performed at different locations on the same sample.

Polydiorganosiloxane A: a dimethylvinylsiloxy-terminated polydimethylsiloxane having a viscosity of about 0.3 to 0.6 Pa·s at 25° C.

Polydiorganosiloxane B: a dimethylvinylsiloxy-terminated polydimethylsiloxane having a viscosity of about 1.8 to 2.4 Pa·s at 25° C.

polydiorganosiloxane C: a dimethylvinylsiloxy-terminated polydimethylsiloxane having a viscosity of about 7 to 12 Pa·s at 25° C.

Polydiorganosiloxane D: a dimethylvinylsiloxy-terminated polydimethylsiloxane having a viscosity of about 45 to 65 Pa·s at 25° C.

Crosslinking Agent A: a mixture consisting of 75 percent by weight of 1,1,5,5-tetramethyl-3(n-propyl)-3-(dimethylsilyloxy)trisiloxane, n-PrSi(OSiMe$_2$H)$_3$, 11 percent by weight of 1,1,7,7-tetramethyl-3,5-di(n-propyl)-3,5-di(dimethylsilyloxy)tetrasiloxane, and 14 percent by weight of other organohydrogensiloxane impurities.

Crosslinking Agent B: a trimethylsiloxy-terminated dimethylmethylhydrogensiloxane having an average of five methylhydrogensiloxane units and three dimethylsiloxane units per molecule and a silicon-bonded hydrogen content of about 0.7 to 0.8 percent by weight.

Silicone Fluid: a trimethylsiloxy-terminated polydimethylsiloxane having a viscosity of 0.1 Pa·s at 25° C.

Catalyst: a platinum complex of 1,3-diethenyl-1,1,3,3-tetramethyldisiloxane.

Examples 1–7

In each of Examples 1–7, a silicone gel composition according to the present invention was prepared by first preparing the two parts specified in Table 1. One-hundred grams of Part 1 and 100 g of Part 2 were prepared by mixing the components designated for each part. The silicone gel composition was prepared by combining 50 grams of Part 1 and 50 grams of Part 2 in a glass jar, sealing the jar, and shaking the contents by hand until homogeneous (about 15 seconds). The composition (80 grams) was immediately poured into a 4 ounce glass jar and cured at 70° C. for 30 minutes. The cured composition was allowed to cool to room temperature prior to tack measurements. The tack values for the cured compositions are shown in Table 3.

Examples 8–12

In each of Examples 8–12, a silicone gel composition outside the scope of the present invention was prepared by first preparing the two parts specified in Table 2. One-hundred grams of Part 1 and 100 g of Part 2 were prepared by mixing the components designated for each part. The silicone gel composition was prepared by combining 50 grams of Part 1 and 50 grams of Part 2 in a glass jar, sealing the jar, and shaking the contents by hand until homogeneous (about 15 seconds). The composition (80 grams) was immediately poured into a 4 ounce glass jar and cured at 70° C.

for 30 minutes. The cured composition was allowed to cool to room temperature prior to tack measurements. The tack values for the cured compositions are shown in Table 3.

TABLE 1

| Part/ | Example | | | | | | |
|---|---|---|---|---|---|---|---|
| Component | 1 | 2 | 3 | 4 | 5 | 6 | 7 |
| Part 1 Polydiorganosiloxane | | | | | | | |
| A | 50.52 | 50.52 | 50.52 | 50.59 | 50.59 | 50.59 | — |
| B | 1.03 | — | — | 2.11 | — | — | 50.28 |
| Catalyst | 0.03 | 0.03 | 0.03 | 0.03 | 0.03 | 0.03 | 0.03 |
| Silicone Fluid | — | — | — | 52.72 | 52.72 | 52.72 | — |
| Part 2 Polydiorganosiloxane | | | | | | | |
| A | 49.48 | 49.48 | 49.48 | 49.41 | 49.41 | 49.41 | — |
| B | 1.03 | — | — | 2.11 | — | — | 49.72 |
| Crosslinking Agent | | | | | | | |
| A | 1.06 | 1.06 | 1.06 | 1.21 | 1.21 | 1.21 | 0.58 |
| Silicone Fluid | — | — | — | 52.72 | 52.72 | 52.72 | — |

TABLE 2

| Part/ | Parts by Weight Example | | | | |
|---|---|---|---|---|---|
| Component | 8 | 9 | 10 | 11 | 12 |
| Part 1 Polydiorganosiloxane | | | | | |
| A | 50.51 | 50.44 | 50.43 | — | 50.57 |
| B | — | — | — | 50.27 | — |
| C | — | — | — | — | — |
| D | — | 1.03 | — | — | — |
| Catalyst | 0.03 | 0.03 | 0.03 | 0.03 | 0.03 |
| Silicone Fluid | — | — | — | — | 50.59 |
| Part 2 Polydiorganosiloxane | | | | | |
| A | 49.49 | 49.56 | 49.57 | — | 49.43 |
| B | — | — | — | 49.73 | — |
| C | — | — | — | — | — |
| D | — | 1.03 | — | — | — |
| Crosslinking Agent | | | | | |
| A | 1.04 | — | — | 0.57 | 1.16 |
| B | — | 0.90 | 0.88 | — | — |
| Silicone Fluid | — | — | — | — | 50.59 |

TABLE 3

| Example | Tack (gram-force) |
|---|---|
| 1 | 149 |
| 2 | 183 |
| 3 | 177 |
| 4 | 25 |
| 5 | 28 |
| 6 | 35 |
| 7 | 209 |
| 8 | 114 |
| 9 | 27 |
| 10 | 29 |
| 11 | 144 |
| 12 | 20 |

That which is claimed is:

1. A silicone gel composition, comprising:
(A) 100 parts by weight of a first polydiorganosiloxane containing an average of at least two silicon-bonded alkenyl groups per molecule and having a viscosity of from 0.2 to 10 Pa·s at 25° C.;
(B) at least about 0.5 part by weight to about 10 parts by weight of a second polydiorganosiloxane containing an average of at least two silicon-bonded alkenyl groups per molecule, wherein the second polydiorganosiloxane has a viscosity at 25° C. of at least four times the viscosity of the first polydiorganosiloxane at 25° C.;
(C) an organohydrogensiloxane having the average formula $R^7Si(SiOR^8_2H)_3$ wherein $R^7$ is an alkyl group having 1 to 18 carbon atoms or aryl, $R^8$ is an alkyl group having 1 to 4 carbon atoms, in an amount sufficient to provide from 0.1 to 1.5 silicon-bonded hydrogen atoms per alkenyl group in components (A) and (B) combined; and
(D) a hydrosilylation catalyst in an amount sufficient to cure the composition.

2. The composition according to claim 1, wherein the viscosity of component (A) is from 0.2 to 5 Pa·s at 25° C.

3. The composition according to claim 2, wherein the viscosity of component (A) is from 0.2 to 3 Pa·s at 25° C.

4. The composition according to claim 1, wherein component (A) has the formula $R^4R^3_2SiO(R^3_2SiO)_nSiR^3_2R^4$ wherein each $R^3$ is independently selected from the group consisting of monovalent hydrocarbon and monovalent halogenated hydrocarbon groups free of aliphatic unsaturation, $R^4$ is alkenyl, and n has a value such that the viscosity of component (A) is from 0.2 to 10 Pa·s at 25° C.

5. The composition according to claim 4 wherein $R^3$ is methyl, $R^4$ is vinyl, and n has a value such that the viscosity of component (A) is from 0.3 to 0.6 Pa·s at 25° C.

6. The composition according to claim 5, wherein component (B) is a dimethylvinylsiloxy-terminated polydimethylsiloxane having a viscosity of from 45 to 65 Pa·s at 25° C.

7. The composition according to claim 1, wherein component (B) has the formula $R^6R^5_2SiO(R^5_2SiO)_nSiR^5_2R^6$ wherein each $R^5$ is independently selected from the group consisting of monovalent hydrocarbon and monovalent halogenated hydrocarbon groups free of aliphatic unsaturation, $R^6$ is alkenyl, and n has a value such that the viscosity of component (B) at 25° C. is at least four times the viscosity of component (A) at 25° C.

8. The composition according to claim 1, wherein the concentration of component (B) is from about 1 to about 5 parts by weight per 100 parts by weight of component (A).

9. The composition according to claim 1, wherein the organohydrogensiloxane has the formula $CH_3CH_2CH_2Si(SiOMe_2H)_3$.

10. The composition according to claim 1, wherein the component (C) is present in an amount sufficient to provide from 0.3 to 1.1 silicon-bonded hydrogen atoms per alkenyl group in components (A) and (B) combined.

11. The composition according to claim 1, wherein the hydrosilylation catalyst is a platinum catalyst.

12. The composition according to claim 1, further comprising a catalyst inhibitor.

13. The composition according to claim 1, further comprising a non-functional silicone fluid.

14. The composition according to claim 13, wherein the silicone fluid has a viscosity of from 0.02 Pa·s to 10 Pa·s at 25° C.

15. The composition according to claim 13, wherein the non-functional silicone fluid is present in an amount from 30 to 150 parts by weight per 100 parts by weight of component (A).

16. The composition according to claim 13, wherein the non-functional silicone fluid has a formula selected from the group consisting of $[(R^9)_2SiO]_n$ and $(R^9)_3SiO—[(R^9)SiO]_q—Si(R^9)_3$ wherein each $R^9$ is independently selected from the group consisting of alkyl, aryl, and $—[(R^{10})SiO]_p—Si(R^{10})_3$ wherein $R^{10}$ is alkyl or aryl, n is from about 2 to about 10, p is 0 or greater, and q is 0 or greater.

17. The composition according to claim 16, wherein the non-functional silicone fluid is a linear trimethylsiloxy-terminated polydimethlysiloxane having a viscosity of about 0.1 Pa·s at 25° C.

18. A silicone gel, comprising a reaction product of the composition of claim 1.

19. A silicone gel, comprising a reaction product of the composition of claim 2.

20. A silicone gel, comprising a reaction product of the composition of claim 4.

21. A silicone gel, comprising a reaction product of the composition of claim 7.

22. A silicone gel, comprising a reaction product of the composition of claim 9.

23. A silicone gel, comprising a reaction product of the composition of claim 11.

24. A multi-part silicone composition, comprising:
   (A) 100 parts by weight of a first polydiorganosiloxane containing an average of at least two silicon-bonded alkenyl groups per molecule and having a viscosity of from 0.2 to 10 Pa·s at 25° C.;
   (B) at least about 0.5 part by weight to about 10 parts by weight of a second polydiorganosiloxane containing an average of at least two silicon-bonded alkenyl groups per molecule, wherein the second polydiorganosiloxane has a viscosity at 25° C. of at least four times the viscosity of the first polydiorganosiloxane at 25° C.;
   (C) an organohydrogensiloxane having the average formula $R^7Si(SiOR^8{}_2H)_3$ wherein $R^7$ is an alkyl group having 1 to 18 carbon atoms or aryl, $R^8$ is an alkyl group having 1 to 4 carbon atoms, in an amount sufficient to provide from 0.1 to 1.5 silicon-bonded hydrogen atoms per alkenyl group in components (A) and (B) combined; and
   (D) a hydrosilylation catalyst in an amount sufficient to cure the composition, provided neither component (A) nor component (B) are present with components (C) and (D) in the same part.

25. A kit for preparing a silicone gel composition, comprising: a first package containing a homogeneous mixture of
   (A) 5 to 95 parts by weight of a first polydiorganosiloxane containing an average of at least two silicon-bonded alkenyl groups per molecule and having a viscosity of from 0.2 to 10 Pa·s at 25° C.;
   (B) 0 to 10 parts by weight of a second polydiorganosiloxane containing an average of at least two silicon-bonded alkenyl groups per molecule, wherein the second polydiorganosiloxane has a viscosity at 25° C. of at least four times the viscosity of the first polydiorganosiloxane at 25° C.; and
   (D) a hydrosilylation catalyst; and
a second package containing
   (A) 95 to 5 parts by weight of a first polydiorganosiloxane containing an average of at least two silicon-bonded alkenyl groups per molecule and having a viscosity of from 0.2 to 10 Pa·s at 25° C.;
   (B) 0 to 10 parts by weight of a second polydiorganosiloxane containing an average of at least two silicon-bonded alkenyl groups per molecule, wherein the second polydiorganosiloxane has a viscosity at 25° C. of at least four times the viscosity of the first polydiorganosiloxane at 25° C.; and
   (C) an organohydrogensiloxane having the average formula $R^7Si(OSiR^8{}_2H)_3$ wherein $R^7$ is an alkyl group having 1 to 18 carbon atoms or aryl, $R^8$ is an alkyl group having 1 to 4 carbon atoms, and wherein the amount of component (A) in the first package and the second package combined is 100 parts by weight, the amount of component (B) in the first package and the second package combined is at least about 0.5 part by weight to about 10 parts by weight, component (C) is present in an amount sufficient to provide from 0.1 to 1.5 silicon-bonded hydrogen atoms per alkenyl group in components (A) and (B) in the first package and the second package combined; and component (D) is present in an amount sufficient to cure the composition formed by combining the first package and the second package.

* * * * *